United States Patent [19]
Hardy et al.

[11] Patent Number: 5,541,000
[45] Date of Patent: Jul. 30, 1996

[54] LATENT, THERMAL CURE ACCELERATORS FOR EPOXY-AROMATIC AMINE RESINS HAVING LOWERED PEAK EXOTHERMS

[75] Inventors: Leslie C. Hardy, St. Paul; Wendy L. Thompson, Roseville, both of Minn.

[73] Assignee: Minnesota Mining and Manufacturing Company, St. Paul, Minn.

[21] Appl. No.: 269,881

[22] Filed: Jul. 1, 1994

Related U.S. Application Data

[63] Continuation-in-part of Ser. No. 107,518, Aug. 17, 1993, abandoned.

[51] Int. Cl.$^6$ .................. C08G 59/68; C08G 65/10
[52] U.S. Cl. .................. 428/413; 528/88; 528/89; 528/90; 528/91; 528/92; 528/93; 528/94; 528/361; 525/502; 525/504; 525/505; 525/506
[58] Field of Search .................. 528/88, 89, 90, 528/91, 92, 93, 94, 361; 525/502, 504, 505, 506; 428/413

[56] References Cited

U.S. PATENT DOCUMENTS

| | | | |
|---|---|---|---|
| 3,018,262 | 1/1962 | Schroeder | 260/29.2 |
| 3,298,998 | 1/1967 | McConnell et al. | 260/47 |
| 3,316,195 | 4/1967 | Grosner et al. | 260/29.6 |
| 3,660,354 | 5/1972 | Uelzmann | 260/47 EC |
| 3,705,129 | 12/1972 | Murio et al. | 260/47 EC |
| 3,714,120 | 1/1973 | Labana et al. | 260/47 EC |
| 3,718,618 | 2/1973 | Wagner et al. | 260/47 EN |
| 3,833,683 | 9/1974 | Dickie et al. | 260/836 |
| 3,856,883 | 12/1974 | Dickie et al. | 260/836 |
| 3,864,426 | 2/1975 | Salensky | 260/837 R |
| 3,894,112 | 7/1975 | Pagel | 260/830 R |
| 3,909,480 | 9/1975 | Ogata et al. | 260/37 EP |
| 4,026,858 | 5/1977 | Andrews et al. | 260/30.2 |
| 4,101,459 | 7/1978 | Andrews | 260/18 EP |
| 4,107,116 | 8/1978 | Riew et al. | 260/23 EP |
| 4,115,296 | 9/1978 | Andrews | 528/92 |
| 4,130,511 | 12/1978 | Andrews | 528/92 |
| 4,331,582 | 5/1982 | Babayan | 523/453 |
| 4,393,185 | 7/1983 | Berner et al. | 528/27 |
| 4,447,586 | 5/1984 | Shimp | 525/504 |
| 4,473,674 | 9/1984 | Stoakley et al. | 523/454 |

(List continued on next page.)

FOREIGN PATENT DOCUMENTS

| | | |
|---|---|---|
| 2040010 | 10/1991 | Canada . |
| 0452263 | 10/1991 | European Pat. Off. . |
| 289280 | 4/1991 | Germany . |
| 49-119998 | 11/1974 | Japan . |
| 56-2329 | 1/1981 | Japan . |
| 56-8427 | 1/1981 | Japan ............ C08G 59/68 |
| 57-192428 | 11/1982 | Japan ............ C08G 59/62 |
| 63-69818 | 3/1988 | Japan . |

OTHER PUBLICATIONS

Abstract for Japanese 57-192428.
Beringer, F. M. et al., *J. Org. Chem.* 1972, 37, 2484.
Butin, K. P. et al., *Bull. Acad. Sci. USSR, Div. Chem. Sci.* (English Translation) 1979, 6, 1329.
Carey and Sundberg, *Advanced Organic Chemistry*, pp. 206–208, Plenum Press (1977).
Casimir, D. J. et al., *J. Chem. Soc.* (London) A. 1961, 5297.
Dickens, F. et al., *Biochem. J.* 1938, 32, 1615.
Efremova, N. V. et al., *J. Org. Chem. USSR* 1988, 24, 47.
*Epoxy Resins Chemistry & Technology*, Second Edition, edited by C. A. May, pp. 1127–1136, Marcel Dekker, Inc., New York (1988).
Foster, R., *Organic Charge–Transfer Complexes*, Academic Press, New York, p. 4 (1969).
Gifford, P. R. et al., *J. Electrochem. Soc.* 1987, 134, 610.
Harriman, A. et al., *J. Phys. Chem.* 1988, 92, 1286.
Kishore et al., *J. Appl. Polm. Sci.* 1986, 31, 2829–2837.
Lee, K. Y. et al., *J. Chem. Soc. Perkin Trans.* 1992, 2, 1011–1017.
Menon, R. K. et al., *Inorg. Chem.* 1989, 28, 1370–1379.
Musumeci, S. et al., *Inorg. Chim. Acta* 1973, 7, 660.
Nelson, I. V. et al., *Analytical Chem.* 1963, 35, 867.
Pearson, R. G., H. Sobel, and J. Songstad, *J. Am. Chem. Soc.* 90, 319 (1968).
Peover, M. E., *J. Chem. Soc.* 1962, 4540.
Petit, M. A. et al., *New J. Chemistry* 1991, 15, 71.
Plesch, P. H. et al., *J. Chem. Soc.* (London) 1971, 2052.
Pragst, F. et al., *Electrochim Acta* 1980, 24, 341.
Rieger, P. H. et al., *J. Am. Chem. Soc.* 1963, 85, 683.
Romanin, A. M. et al., *J. Electroanal. Chem.* 1981, 130, 245.
Schwartz, W. M. et al., *J. Am. Chem. Soc.* 1961, 83, 3164.
Stoakley et al., *J. Appl. Polm. Sci.* 1986, 31, 225–236.
Tsiamis, C. et al., *J. Electroanal. Chem.* 1988, 252, 109.
Tsveniashvili, V. Sh. et al., *J. General Chem. USSR* 1986, 56, 863.
Volz, H. et al., *Tetrahedron Letters* 1969, 27, 2275.
Wiberg, K. B. et al., *J. Am. Chem. Soc.* 1970, 92, 7154.

*Primary Examiner*—Frederick Krass
*Attorney, Agent, or Firm*—Gary L. Griswold; Walter N. Kirn; Lucy C. Weiss

[57] ABSTRACT

A thermally-curable aromatic amine-epoxy composition comprises (a) at least one polyepoxy compound;

(b) a curing amount of at least one aromatic polyamine compound; and (c) a catalytically effective amount of at least one cure accelerator compound which is a π-electron acceptor, and which lowers the cure exotherm peak temperature (as measured by differential scanning calorimetry (DSC) at 10° C. per minute) of the composition by at least about 8 percent relative to the corresponding composition without the cure accelerator. Such accelerator compounds moderate and/or accelerate the thermal curing of aromatic amine-epoxy resins, enabling cure to occur at lower temperatures and/or in shorter time periods than those required for the unaccelerated composition.

19 Claims, No Drawings

U.S. PATENT DOCUMENTS

| | | | |
|---|---|---|---|
| 4,524,181 | 6/1985 | Adam et al. | 525/107 |
| 4,544,732 | 10/1985 | Corley | 528/90 |
| 4,554,342 | 11/1985 | Corley | 528/90 |
| 4,579,931 | 4/1986 | Corley | 528/90 |
| 4,581,436 | 4/1986 | Corley | 528/90 |
| 4,593,056 | 6/1986 | Qureshi et al. | 523/445 |
| 4,668,757 | 5/1987 | Nichols | 528/88 |
| 4,683,281 | 7/1987 | Goel | 528/89 |
| 4,684,678 | 8/1987 | Schultz et al. | 523/466 |
| 4,725,652 | 2/1988 | Bertram et al. | 525/485 |
| 4,757,125 | 7/1988 | Goel | 528/90 |
| 4,761,466 | 8/1988 | Goel | 528/90 |
| 4,775,734 | 10/1988 | Goel | 528/89 |
| 4,783,518 | 11/1988 | Goel | 528/90 |
| 4,814,391 | 3/1989 | Colborn | 525/370 |
| 4,874,833 | 10/1989 | Kershaw | 528/90 |
| 4,894,431 | 1/1990 | Armbruster et al. | 528/90 |
| 4,925,901 | 5/1990 | Bertram et al. | 525/482 |
| 4,962,179 | 10/1990 | Corley | 528/90 |
| 5,021,471 | 6/1991 | Treybig | 523/414 |
| 5,109,009 | 4/1992 | Nielsen et al. | 514/311 |
| 5,134,239 | 7/1992 | Bertram et al. | 546/112 |
| 5,140,079 | 8/1992 | Muskopf et al. | 525/482 |
| 5,169,473 | 12/1992 | Bertram et al. | 156/307.4 |
| 5,202,407 | 4/1993 | Pham et al. | 528/89 |
| 5,208,317 | 5/1993 | Pham et al. | 528/89 |
| 5,214,098 | 5/1993 | Setiabudi et al. | 525/109 |

LATENT, THERMAL CURE ACCELERATORS FOR EPOXY-AROMATIC AMINE RESINS HAVING LOWERED PEAK EXOTHERMS

This is a continuation-in-part of U.S. patent application Ser. No. 08/107,518 filed on Aug. 17, 1993 now abandoned.

FIELD OF THE INVENTION

This invention relates to compounds which accelerate and/or moderate the thermal cure of epoxy resin compositions. In other aspects, this invention relates to thermally-curable epoxy resin compositions comprising the accelerator compounds, to articles comprising the compositions, and to a process for controlling the cure-cycle viscosity of thermally-curable epoxy resin compositions.

BACKGROUND OF THE INVENTION

Epoxy thermoset resins can be utilized in a variety of applications including adhesive and structural material applications, e.g., carbon fiber composites for aerospace. The use of aromatic diamine curatives for polyepoxy resins enables the formation of high glass transition temperature (high $T_g$) crosslinked polymers (thermoset resins). High cure temperatures (often followed by long post-cure heating) are generally required to achieve high performance characteristics.

Many catalysts or accelerators are used to reduce the curing time for aromatic diamine-polyepoxy resins. Typical of these are phenols, imidazoles, boronfluoride-amine complexes, metal fluoroborates such as zinc fluoroborate and copper fluoroborate, and triphenyl phosphite. But latent catalysts for high performance epoxy thermosets remain an industry need.

Japanese Patent Publication No. 57-192428 (Ajinomoto Co., Inc.) discloses a composition comprising an alicyclic epoxy resin, epoxidized butadiene polymer and/or epoxidized soybean oil, trialkanolamine borate, and pyrocatechol or pyrogallol.

U.S. Pat. No. 4,101,459 (Andrews) describes a composition comprising an epoxide resin, an aromatic, heterocyclic, or cycloaliphatic polyamine, and a salt of trifluoromethanesulfonic acid which is used to accelerate the cure.

U.S. Pat. No. 4,331,582 (Babayan) describes a latent catalyst for the reaction of diaminodiphenylsulfone (DDS) with epoxides. The catalyst is the half salt of an imidazole and a strong aromatic sulfonic acid such as toluene sulfonic acid.

U.S. Pat. No. 4,447,586 (Shimp) describes compositions made from polyepoxide resins and hindered aromatic diamines. The cure of these compositions is accelerated with copper fluoroborate.

U.S. Pat. No. 4,593,056 (Qureshi et al.) describes compositions comprising an epoxy resin having at least two 1,2-epoxy groups per molecule, an aromatic diamine hardener, and as a cure accelerator an aromatic trihydroxy compound.

U.S. Pat. No. 4,925,901 (Bertram et al.) discloses compositions comprising: (1) an epoxide containing compound, (2) a phenolic hydroxyl containing compound, and (3) a catalyst compound. The catalyst compound comprises the product resulting from contacting an onium salt, amine, or amine salt with an acid or a salt of an acid having a weak nucleophilic anion.

U.S. Pat. No. 5,134,239 (Bertram et al.) teaches the use of latent catalyst compounds for catalyzing the reaction between epoxide and aromatic hydroxyl groups. These catalysts are prepared by contacting a nitrogen-containing heterocyclic compound with an acid having a weak nucleophilic anion.

SUMMARY OF THE INVENTION

Briefly, in one aspect, this invention provides a thermally-curable aromatic amine-epoxy composition. The composition comprises (a) at least one polyepoxy compound; (b) a curing amount of at least one aromatic polyamine compound; and (c) a catalytically effective amount of at least one cure accelerator compound which is a π-electron acceptor, and which lowers the cure exotherm peak temperature (as measured by differential scanning calorimetry (DSC) at 10° C. per minute) of the composition by at least about 8 percent relative to the corresponding composition without the cure accelerator. It has been discovered that such accelerator compounds moderate and/or accelerate the thermal curing of aromatic amine-epoxy resins, enabling cure to occur at lower temperatures and/or in shorter time periods than those required for the unaccelerated composition. The compounds accelerate the amine-epoxy reaction to the exclusion of homopolymerization of the polyepoxy compound.

The aromatic amine-epoxy composition of the invention provides flexibility as to the choice of resin cure temperature and, thus, as to the heat resistance (and cost) of the substrates or mold toolings utilized for a particular application. Accordingly, a single epoxy resin system can be tailored to a variety of customer needs with varying cure temperature requirements. The composition of the invention does not require solvent (eliminating the need for additional process steps for solvent addition and removal) and can be utilized as a one-part system, if desired (eliminating the need for on-site mixing of components). The shortened cure times provided by the composition enable reduced cycle times in the manufacture of molded parts, etc.

Surprisingly, the accelerator compounds utilized in the aromatic amine-epoxy compositions of the invention provide compositions which exhibit good room-temperature latency properties, some of them even exhibiting essentially the same room-temperature latency as the corresponding compositions without accelerator compound. The compositions can be stored at room temperature for long periods of time, e.g., about two months (depending upon the nature of the aromatic polyamine compound utilized), without catalysis of either the amine-epoxy reaction or the homopolymerization of the polyepoxy compound. In addition, compositions of the invention containing low levels of cure accelerator exhibit partial curing early in the thermal cure cycle. The accelerators can thus be utilized to adjust or control the cure-cycle viscosity of an aromatic amine-epoxy composition, e.g., so as to reduce or eliminate the voids and imperfections in cured products which result from the bleeding of excessive amounts of resin during the application of pressure (for the shaping of composite parts).

In other aspects, this invention also provides an article comprising the composition of the invention, a process for controlling the cure-cycle viscosity of thermally-curable epoxy resin compositions, and novel cure accelerator compounds.

DETAILED DESCRIPTION OF THE INVENTION

Universal agreement on the terminology used in the field of epoxy resins has not been reached. The term "epoxy resin" has been used to indicate not only any compound containing at least one group having a three-membered ring of which one member is oxygen but also both the uncured and cured compositions containing such a compound. As used herein, the term "polyepoxy compound" means a compound that contains more than one

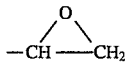

group. The term "aromatic amine-epoxy composition" is used herein to indicate an uncured composition that can be cured to a "cured aromatic amine-epoxy resin." During the curing of the "aromatic amine-epoxy composition" the "polyepoxy compound" as exemplified by

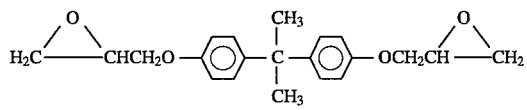

and the aromatic polyamine curing agent exemplified by

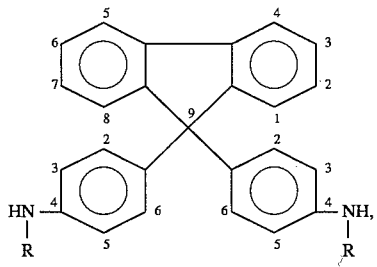

wherein R is as defined infra, react to form a "cured aromatic amine-epoxy resin" having units of

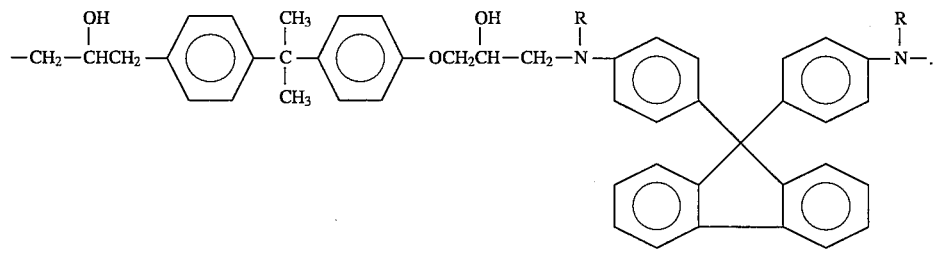

Polyepoxy compounds which can be utilized in the composition of the invention include both aliphatic and aromatic polyepoxides, but aromatic polyepoxides are preferred. The aromatic polyepoxides are compounds containing at least one aromatic ring structure, e.g. a benzene ring, and more than one epoxy group. Preferred aromatic polyepoxides include the polyglycidyl ethers of polyhydric phenols (e.g., bisphenol A derivative resins, epoxy cresol-novolac resins, bisphenol F derivative resins, epoxy phenol-novolac resins) and the glycidyl esters of aromatic carboxylic acids. The most preferred aromatic polyepoxides are the polyglycidyl ethers of polyhydric phenols.

Representative examples of aliphatic polyepoxides which can be utilized in the composition of the invention include 3',4'-epoxycyclohexylmethyl-3,4-epoxycyclohexanecarboxylate, 3,4-epoxycyclohexyloxirane, 2-(3',4'-epoxycyclohexyl)-5,1"-spiro-3",4"-epoxycyclohexane-1,3-dioxane, bis(3,4-epoxycyclohexylmethyl)adipate, the diglycidyl ester of linoleic dimer acid, 1,4-bis(2,3-epoxypropoxy)butane, 4-(1,2-epoxyethyl)-1,2-epoxycyclohexane, 2,2-bis(3,4-epoxycyclohexyl)propane, polyglycidyl ethers of aliphatic polyols such as glycerol or hydrogenated 4,4'-dihydroxydiphenyl-dimethylmethane, and mixtures thereof.

Representative examples of aromatic polyepoxides which can be utilized in the composition of the invention include glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, e.g., N,N-diglycidylbenzeneamine, bis(N,N-diglycidyl-4-aminophenyl)methane, 1,3-bis(N,N-diglycidylamino)benzene, and N,N-diglycidyl-4-glycidyloxybenzeneamine, and mixtures thereof; and the polyglycidyl derivatives of polyhydric phenols, e.g., 2,2-bis-[4-(2,3-epoxypropoxy)phenyl] propane, the polyglycidyl ethers of polyhydric phenols such as tetrakis(4-hydroxyphenyl)ethane, pyrocatechol, resorcinol, hydroquinone, 4,4'-dihydroxydiphenyl methane, 4,4'dihydroxydiphenyl dimethyl methane, 4,4'-dihydroxy-3,3'-dimethyldiphenyl methane, 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris-(4-hydroxyphenyl)methane, polyglycidyl ethers of novolacs (reaction products of monohydric or polyhydric phenols with aldehydes in the presence of acid catalysts), and the derivatives described in U.S. Pat. Nos. 3,018,262 and 3,298,998, the descriptions of which are incorporated herein by reference, as well as the derivatives described in the Handbook of Epoxy Resins by Lee and Neville, McGraw-Hill Book Co., New York (1967), and mixtures thereof. A preferred class of polyglycidyl ethers of polyhydric phenols for use in the composition of the invention are the diglycidyl ethers of bisphenol that have pendant carbocyclic groups, e.g., those described in U.S. Pat. No. 3,298,998, the description of which is incorporated herein by reference. Examples of such compounds include 2,2-bis [4-(2,3-epoxypropoxy)phenyl]norcamphane and 2,2-bis[4-(2,3-epoxypropoxy)phenyl]decahydro-1,4,5,8-dimethanonaphthalene. A preferred compound is 9,9-bis[4-(2,3-epoxypropoxy)phenyl]fluorene.

Aromatic polyamine compounds which can be utilized as curing agents in the composition of the invention are those aromatic compounds which have two or more primary or secondary amino groups attached directly to carbon atoms of an aromatic ring structure. Representative examples of suitable compounds include 1,2-, 1,3-, and 1,4-benzenediamine, bis(4-aminophenyl)methane, bis(4-aminophenyl)sulfone, 1,3-xylenediamine, 2,4-diamino-3,5-dimethylbenzene, bis(4-aminophenyl)methane, 1,4-bis(4-aminophenyldimethylmethyl)benzene (EPON HPT™-1061 curative, available from Shell Chemical Co.), 1,4-bis(4-amino-3,5-dimethylphenyl) dimethylmethyl)benzene (EPON HPT™-1062 curative, available from Shell Chemical Co.), 4,4'-diamino-3,3'-dimethylbiphenyl, 4'-diamino-3,3'-dimethoxybiphenyl, 9,9-bis(4-aminophenyl)fluorene, 9,9-bis(4-amino-3-chlorophenyl)fluorene, 9,9-bis(4-amino-3-methylphenyl)fluorene, 4,4'-diaminodiphenylsulfone, 3,3'-diaminodiphenylsulfone, 2,5-diethyl-4-methyl-meta-phenylenediamine, methylenedianiline, α,α'-bis(3,5-dialkyl-4-aminophenyl)-p-diisopropylbenzene, 4,4'-methylene bis(2,6-dialkylaniline), 1,3-propanediol-bis(4-aminobenzoate), 1,4-, 1,5-, and 1,8-diaminonaphthalenes, and mixtures thereof.

Preferred aromatic polyamine compounds for use in the composition of the invention are 4,4'-diaminodiphenylsulphone, 3,3'-diaminodiphenylsulphone, 1,3-propanediol bis(4-aminobenzoate), and the 9,9-bis(aminophenyl)fluorenes described in U.S. Pat. No. 4,684,678 (Schultz et al.) having the general formula

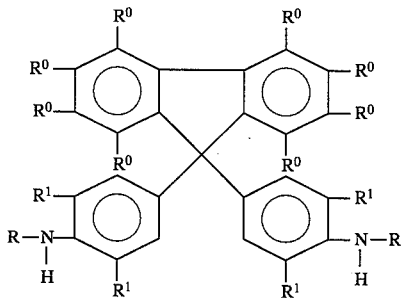

wherein each $R^0$ is independently selected from hydrogen and groups that are inert in the polymerization of epoxide group-containing compounds, such groups being preferably selected from halogen, linear and branched alkyl groups having 1 to 6 carbon atoms, phenyl, nitro, acetyl, and trimethylsilyl;

each R is independently selected from hydrogen and linear and branched alkyl groups having 1 to 6 carbon atoms; and each $R^1$ is independently selected from R, phenyl, and halogen.

Cure accelerator compounds which can be utilized in the composition of the invention are π-electron acceptors. As described by R. Foster in *Organic Charge-Transfer Complexes* (R. Foster, Academic Press, New York, page 4 (1969)), π-electron acceptors are not Lewis acids (which accept pairs of electrons) but rather are compounds for which acceptance of electrons is not limited to acceptance of an electron pair. A single electron or a fraction of an electron can be accepted. A number of different classes of compounds have been found to function as π-electron acceptors, e.g., aromatic cations, neutral organic compounds, ionic coordination compounds, ionic organometallic compounds, neutral coordination compounds, and quaternized iminothioethers.

π-electron acceptors which are useful in the composition of the invention are those which lower the cure exotherm peak temperature (as measured by differential scanning calorimetry (DSC) at 10° C. per minute) of the composition by at least about 8 percent (preferably about 12 percent, more preferably about 16 percent) relative to the corresponding composition without the acceptor. Such acceptors have been found to moderate and/or accelerate the thermal curing of aromatic amine-epoxy resins, enabling cure to occur at lower temperatures and/or in shorter time periods than those required for the composition without acceptor. The acceptors moderate and/or accelerate the amine-epoxy reaction to the exclusion of homopolymerization of the polyepoxy compound. Preferably, the acceptors lower the cure exotherm peak temperature by an amount ranging from about 19° C. to about 170° C., more preferably from about 28° C. to about 170° C., most preferably from about 38° C. to about 150° C., relative to the unaccelerated composition.

Since the reduction potential ($E_{1/2}$) of a species correlates with its π-electron acceptance character (in general, the more positive the reduction potential, the better the acceptance properties), cure accelerator compounds useful in the composition of the invention preferably have a reduction potential which is greater than about −1.5 volts versus a saturated calomel electrode (S.C.E.), more preferably between about −1.2 and about +0.2 volts, and most preferably between about −1.2 and about −0.16 volts. Reduction potentials can be measured experimentally or can be obtained from references such as the *CRC Handbook Series in Organic Electrochemistry*, Meites, Zuman, and Rupp, Vols. 1–5, CRC Press, Cleveland, Ohio (1977) or *Encyclopedia of Electrochemistry of the Elements*, Vols. 11–15, edited by A. J. Bard and H. Lund, Marcel Dekker (1978–1984). Reduction potential is the potential (voltage) measured on an electrode immersed in a solution containing the moiety being reduced.

Preferred cure accelerator compounds are π-electron acceptors selected from the group consisting of neutral organic compounds, ionic coordination compounds, ionic organometallic compounds, quaternized iminothioethers, and aromatic cations which have a formal charge on an endocyclic heteroatom (as these are more photolytically stable than those with a formal charge on an exocyclic heteroatom) and which are quaternized by groups other than hydrogen (as acidic cations have less desirable latency characteristics). Most preferably, the compounds are selected from the group consisting of neutral organic compounds, quaternized iminothioethers, and aromatic cations which have a formal charge on an endocyclic heteroatom and which are quaternized by groups other than hydrogen.

Useful cure accelerators of the aromatic cation class are salts of aromatic cation π-electron acceptors with anions which are preferably of low nucleophilicity. Suitable aromatic cations include quaternized aromatic nitrogen heterocycles and cationic annulenes. Suitable quaternized aromatic heterocycles have one ring nitrogen and an electron-withdrawing substituent, e.g., a cyano group, a halogen atom, a second ring nitrogen, one or more fused rings, or other electron-withdrawing moieties. Suitable cationic annulenes include cycloheptatrienylium (tropylium) and 3-methylcycloheptatrienylium.

Anions of the aromatic cation salts are preferably selected from complex metal and metalloid halogen anions, organic sulfonates, arylborates, and the like, and are preferably of low nucleophilicity (sometimes termed non-nucleophilic, where nucleophilicity refers to the rate of a nucleophilic substitution reaction and can be contrasted with basicity, which refers to effects on equilibria). (See, e.g., the discussion by Carey and Sundberg in *Advanced Organic Chemistry*, Part A, Plenum Press (1977).) The nucleophilic constant, n, is commonly used as a measure of the relative reaction rates of various nucleophiles. Preferred anions for purposes of this invention have nucleophilic constants greater than about 11.5 (where the standard tables end). (Commonly used tables of nucleophilic constants can be found in Carey & Sundberg, *supra.*, Table 5.3, page 208, and in the article by R. G. Pearson, H. Sobel, and J. Songstad in J. Am. Chem. Soc. 90, 319 (1968), Table III.)

Preferred anions can be represented by the formula $$MX_a^{n-}$$

wherein M is a metal or a metalloid, X is a halogen radical, a is an integer of 1 to 10, and n is an integer of 1 to 3. $MX_a^{n-}$ anions are well-known in the art and include, but are not limited to, $BF_4^-$, $FeCl_4^-$, $PF_6^-$, $AsF_6^-$, $SbF_6^-$, $SnCl_6^-$, $BiCl_5^{--}$, $AlF_6^{---}$, $GaCl_4^-$, $InF_4^-$, $TiF_6^-$, $ZrF_6^-$, and the like. Other suitable anions include $(C_6H_5)_4B^-$, $(H_3CC_6H_4)_4B^-$, $(CH_3)_2(C_6H_5)_2B^-$, $H_3CC_6H_4SO_3^-$, and $CF_3SO_3^-$. M can be a main group metal or a transit e.g., Sb, Fe, Sn, Bi, Al, Ga, In, Ti, Zr, Sc, V, Cr, Mn, or Co; a rare earth element, e.g., lanthanide: Ce, Pr, or Nd, or actinide: Th, Pa, U, or Np; or a metalloid, e.g., B, P, or As. Preferably, anions are selected from arylborates, organic sulfonates, complex metal and metalloid halogen anions, and perfluoroalkane sulfonates.

Representative examples of suitable aromatic cation accelerator compounds for use in the composition of the invention include 4-cyano-N-methylpyridinium tetraphenylborate, diphenyliodonium hexafluoroantimonate, 1-methylpyrimidinium hexafluoroantimonate, 4-cyano-1-methylpyridinium hexafluorophosphate, 1-ethyl-4-methoxycarbonylpyridinium-hexafluoroantimonate, N-methylpyrazinium 4-methylbenzenesulfonate, N-ethylpyrazinium tetraphenylborate, 3-cyano-N-methylpyridinium tetraphenylborate, 2-cyano-N-methylpyridinium tetraphenylborate, 2-chloro-N-methylpyridinium tetraphenylborate, 2-fluoro-N-methylpyridinium tetraphenylborate, 4-(methoxycarbonyl)-N-ethylpyridinium tetraphenylborate, 2-chloro-N-methylpyridinium trifluoromethanesulfonate, N-methylquinolinium tetraphenylborate, 2-methyl-N-ethylquinolinium tetraphenylborate, N-methylacridinium tetraphenylborate, 2,6-dichloro-N-methylpyridinium tetraphenylborate, N-methylisoquinolinium tetraphenylborate, N-fluoropyridinium tetraphenylborate, N-fluoropyridinium trifluoromethanesulfonate, 2,4,6-trimethyl-N-fluoropyridinium tetraphenylborate, 2,4,6-trimethyl-N-fluoropyridinium trifluoromethanesulfonate, 4-methoxy-1-nitropyridinium tetraphenylborate, 4-cyano-1-methoxypyridinium tetraphenylborate, N-methylpyrazinium tetraphenylborate, N-methylpyrazinium trifluoromethanesulfonate, N-methylpyrazinium hexafluorophosphate, N-methylpyrazinium tetrafluoroborate, N-methylated-2-methylpyrazine tetraphenylborate (mixture of isomers), N-methylpyridazinium tetraphenylborate, N-methylpyrimidinium tetraphenylborate, N-methylphenazinium tetraphenylborate, N-methylquinoxalinium tetraphenylborate, N-methylphthalazinium tetraphenylborate, N-ethylquinazolinium tetraphenylborate, N-ethylcinnolinium tetraphenylborate, 2,4,6-triphenylpyrilium tetraphenylborate, 2,4,6-triphenylpyrilium tetrafluoroborate, 2,4,6-triphenylthiapyrilium tetraphenylborate, 2-phenyl-1-benzopyrilium tetraphenylborate, 1-benzopyrilium tetraphenylborate, xanthylium tetraphenylborate, 2,4,6-trimethylpyrilium tetraphenylborate, phenoxazinylium tetraphenylborate, phenothiazinylium tetraphenylborate, N-methyl-1,3,5-triazine tetraphenylborate, 3,4-dimethyl-5-(2-hydroxyethyl)thiazolium tetraphenylborate, 3-benzyl-5-(2-hydroxyethyl)-4-methylthiazolinium tetraphenylborate, 3-(carboxymethyl)benzothiazolium tetraphenylborate, 2-(4-dimethylaminophenyl)-3,6-dimethylbenzothiazolium tetraphenylborate, 2-ethyl-5-phenylisoxazolium-3'-sulfonate, 2,3,5-triphenylthiazolium tetraphenylborate, 2,3,5-triphenyloxazolium tetraphenylborate, 2,3,5-triphenyl-2H-tetrazolium tetraphenylborate, 2,5-diphenyl-3-methyl-1,3,4-oxadiazolium tetraphenylborate, 2,5-diphenyl-3-methyl-1,3,4-thiadiazolium tetraphenylborate, 1-phenyltropylium tetraphenylborate, tropylium tetraphenylborate, tropylium hexafluorophosphate, tropylium tetrafluoroborate, 1,4-diphenyltropylium tetraphpenylborate, 4-cyanopyridinium tetraphenylborate, pyrazinium tetraphenylborate, 2-methylpyrazinium tetraphenylborate, diphenyliodonium tetraphenylborate, 4-diazo-N,N-diethylaniline tetraphenylborate, 4-diazo-N,N-diethylaniline tetrafluoroborate, and mixtures thereof.

Neutral organic compounds can also be good π-electron acceptors and include aromatic or unsaturated systems containing electron-withdrawing substituents, e.g., nitro, cyano, and halo moieties. Representative examples of suitable neutral organic π-electron acceptors include tetrachloro-1,4-benzoquinone, tetrafluoro-1,4-benzoquinone, 7,7,8,8-tetracyanoquinodimethane, 2,3-dichloro-5,6-dicyano-1,4-benzoquinone, 1,4-dicyanotetrafluorobenzene, 1,2-dicyanotetrafluorobenzene, tetracyanoethylene, and mixtures thereof.

Representative examples of suitable ionic coordination compounds and ionic organometallic compounds include tris(1,10-phenanthroline)iron(II) bis(tetraphenylborate), tris(1,10-phenanthroline)ruthenium(II) bis(tetraphenylborate), tris(2,2'-bipyridine)iron(II) bis(tetraphenylborate), ferrocinium tetrachloroferrate, ferrocinium hexafluorophosphate, ferrocinium tetrafluoroborate, tropyliummolybdenum tricarbonyl tetrafluoroborate, tropyliumchromium tricarbonyl tetrafluoroborate, and mixtures thereof.

Representative examples of suitable neutral coordination compounds include copper(II) trifluoroacetylacetonate, manganese(II) acetylacetonate, manganese(III) acetylacetonate, cobalt(II) acetylacetonate, cobalt(III) acetylacetonate, and mixtures thereof.

Representative examples of suitable quaternized iminothioethers include 3-ethyl-2-methylthiazolinium trifluoromethanesulfonate, 3-ethyl-2-methylthiazolinium tetraphenylborate, 3-ethyl-2,5-dimethylthiazolinium tetraphenylborate, 3-benzyl-2-methylthiazolinium tetraphenylborate, N,N-dimethyl-2-methylthiol iminium, N,N-diethyl-2-methylthiol iminium, N-acetyl-N-phenyl-2-ethylthiol iminium, and mixtures thereof.

The thermally-curable aromatic amine-epoxy composition of the invention can be prepared by combining at least one polyepoxy compound, at least one aromatic polyamine compound, and at least one cure accelerator compound. Polyamine curing agent is utilized in an amount effective to cure the polyepoxy component of the composition. Generally, the polyamine can be used in an amount of from about 1.0 to about 1.8 equivalents per epoxy equivalent, preferably from about 1.0 to about 1.7 equivalents. In terms of weight percent, polyamine can generally be present in an amount of about 10 to about 60, preferably about 20 to about 50, more preferably about 30 to about 45 weight percent, based on the combined weights of the polyepoxy and polyamine.

Catalytically effective amounts of cure accelerator compound are utilized in the composition of the invention. Such amounts are those which enable the composition to cure at lower temperatures and/or in shorter time periods than those required for the composition without cure accelerator. Generally, cure accelerator can be present in the composition at levels of from about 0.01 to about 10 weight percent (based upon the weight of the entire composition), preferably from about 0.05 to about 5 weight percent, more preferably from about 0.05 to about 3 weight percent. Choice of cure accelerator compound can be based in part upon shelf life stability considerations and thus upon the nature of the polyamine and the polyepoxy chosen.

After the polyepoxy, polyamine, and cure accelerator are combined, the resulting composition is generally mixed until the solids are uniformly distributed. Although not preferred, distribution may be facilitated by addition of heat or a suitable organic solvent. Suitable solvents include acetone, methylethyl ketone, diisopropyl ketone, and the like.

Various adjuvants can be added to the composition of the invention to alter the characteristics of the cured composition. Useful adjuvants include thixotropic agents such as fumed silica; pigments (to enhance color tones) such as ferric oxide, brick dust, carbon black, and titanium oxide; fillers such as silica, magnesium sulfate, calcium sulfate, and beryllium aluminum silicate; clays such as betonite; glass beads and bubbles; reinforcing materials such as unidirectional, woven and nonwoven webs of organic and inorganic fibers such as polyester fibers, polyimide fibers, glass fibers, polyamide fibers such as poly(p-phenylene terephthalamide) (Kevlar™ fiber, available from E. I. Dupont de Nemours and Co., Inc.), carbon fibers, and ceramic fibers. Amounts of up to about 200 parts of adjuvant per 100 parts of the composition can be utilized. The composition can also contain monoepoxy compound(s) as reactive diluents to modify the properties of the composition.

A particularly desirable adjuvant is a rubber heterophase that can be introduced into the composition. The rubber heterophase can be introduced as a latex of dispersed natural or synthetic rubber, as is disclosed in U.S. Pat. No. 3,316,195, or as a graded rubber or core shell rubber particle, as is disclosed in U.S. Pat. Nos. 3,833,683, 3,856,883, and 3,864,426. The rubber heterophase can also be introduced into the composition by dissolving reactive elastomer into the composition which phase-separates during curing. (See, e.g., U.S. Pat. Nos. 4,107,116 and 3,894,112.) A detailed discussion of the use of rubber heterophases in epoxy resins can be found in Advances in Chemistry Series 208 *Rubbery-Modified Thermoset Resins*, edited by C. K. Riew and J. K. Gillham, American Chemical Society, Washington (1984). A preferred rubber heterophase is the insoluble, in situ polymerized elastomeric particles disclosed in U.S. Pat. No. 4,524,181. Generally, up to about 25 parts of rubbery phase per 100 parts of the composition can be used.

The composition of the invention is useful in protective coatings for various articles such as appliances, for impregnating and embedding materials for electrical components, for molding and coating applications to form shaped articles, for composite articles of woven or nonwoven webs impregnated with the composition of the invention, and for other uses where the operating temperature of the article or material is elevated. The composition of the invention is particularly useful in structural composites, filament wound articles, pultruded articles, film adhesives, printed wiring boards, and the like.

In addition, the cure accelerator compounds of the invention are useful for controlling the viscosity profiles of thermosetting resin compositions. Compositions of the invention containing low levels of cure accelerator exhibit low initial viscosities (useful for coating and compounding steps, etc.) but become partially cured (and therefore of increased viscosity) early in the thermal cure cycle. The accelerators can thus be utilized to adjust or control the cure-cycle viscosity of an aromatic amine-epoxy composition, e.g., so as to reduce or eliminate the voids and imperfections in cured products which result from the bleeding of excessive amounts of resin during the application of pressure (for the shaping of composite parts).

Objects and advantages of this invention are further illustrated by the following examples, but the particular materials and amounts thereof recited in these examples, as well as other conditions and details, should not be construed to unduly limit this invention. In the examples, all parts and percents are by weight and temperatures are in degrees centigrade, unless otherwise noted.

In the examples, glass transition temperature ($T_g$) and the peak temperature of reaction exotherms (referred to as the cure exotherm temperature) were measured by differential scanning calorimetry (DSC) using a DSC Model 912 Thermal Analyst 2000 manufactured by dupont. DSC is a well-known analytical technique in which samples are heated at a constant rate, with respect to a reference, and the differential heat flow (dH/dT) needed to maintain the constant rate is measured. Thus, temperatures for endothermic events, such as melting, and exothermic events, such as reactions, can be determined. The DSC technique and its application to the study of epoxy resins are described in *Epoxy Resins Chemistry & Technology*, Second Edition, edited by C. A. May, pages 1127–36, Marcel Dekker, Inc., New York (1988), which states that "[b]ecause of its sensitivity to any reaction involving heat flow changes, DSC is especially useful for studying the cure of reactive epoxy systems." The exotherm peak temperature corresponds to the maximum deflection of the DSC curve. The variation of peak exotherm temperature with heating rate is systematic and well-known such that it can be used to obtain kinetic parameters, as described in *Epoxy Resins Chemistry & Technology*, Second Edition, and references therein. The exotherm peak temperatures determined and reported for all the examples herein were determined at a heating rate of 10° C./min. Thus, comparisons between the temperatures can readily be made.

EXAMPLES

Some cure accelerator compounds were prepared by a metathetical reaction between an aqueous solution of a quaternary salt of a suitable aromatic nitrogen heterocycle with a haloalkane or a suitable annalenium halide and an aqueous solution of an alkali metal salt of a tetraarylborate. Quaternary halide precursors of suitable aromatic heterocycles were prepared by known methods for quaternizing nitrogen-containing compounds with haloalkanes. Other cure accelerator compounds were prepared by standard metathesis reactions of silver salts of suitable anions of low nucleophilicity in a suitable solvent such as acetonitrile.

EXAMPLE 1

A latent, thermally-curable aromatic amine-epoxy composition was prepared and its DSC Cure Exotherm measured as follows: 30 g of 2,2-bis[4-(2,3epoxypropoxy) phenyl] propane (available from Dow Chemical as DER™ 331 or 332 resin) were mixed until a smooth dispersion was obtained with 1.74 g (3 parts per 100 parts by weight of diamine-epoxy) of N-methylpyrazinium tetraphenylborate (prepared as described below). To this dispersion was added 26.3 g of 9,9-bis(3-chloro-4-aminophenyl)fluorene (CAF) (prepared as described in Example 4 of U.S. Pat. No. 4,684,678) 1.5 equivalents of NH per equivalent of epoxy was added, and mixing was continued until the composition was uniformly dispersed again. Samples of the composition were then evaluated on a dupont Dual Cell Differential Scanning Calorimeter (DSC) by raising the temperature from 35° C. to 325° C. at a rate of 10° C. per minute to determine the DSC Cure Exotherm. (Samples were typically 2 to 5 mg, sealed under air in hermetically-sealed aluminum pans. The sample chamber was purged with nitrogen. The system was calibrated versus indium for temperature and enthalpy of reaction. Data were analyzed with standard software from the vendor.) The cure exotherm peak temperature for the composition was found to be 134° C. (compared to an exotherm of 230° C. for the unaccelerated composition), indicating a lowering of the cure exotherm by 96° C.

N-methylpyrazinium tetraphenylborate was prepared by quaternarizing pyrazine with iodomethane via the Menschutkin Reaction. Pyrazine (Aldrich), 100 g (1.25 mol), was dissolved in 300 mL acetonitrile (Baxter, UV grade) and cooled to 0° C. 176 g (1.24 mol) iodomethane (Aldrich, 99.5%) was added to the cooled solution via an addition funnel over about 1.5 hours while stirring the resulting mixture. After stirring for 1 hour at 0° C., the mixture was warmed to about 20° C. and stirred for a few more hours. The mixture was then stoppered and stored in the dark for 2 days while a large amount of yellow crystals crystallized out of solution. The solvent was decanted (about 90%) and the remainder vacuum distilled off along with any unreacted starting materials. No purification was needed. An 86.9% of theoretical yield of N-methylpyrazinium iodide was obtained.

To convert the iodide to the tetraphenylborate, a standard aqueous metathasis reaction was performed: N-methylpyrazinium iodide (111.0 g, 0.50 mol) was dissolved in 500 mL deionized water. Sodium tetraphenylborate (171.1 g, 0.50 mol) (Aldrich) was dissolved in 2.0 L deionized water. The two solutions were mixed while stirring with a spatula and left standing for about 1 hour until the yellow precipitate became thick. The precipitate was collected by suction filtration, rinsed 3 times, and then dried in an oven at about 60° C. for about 16 hours.

Other quaternized heterocycles were made by the same procedure using other heterocycles, alkylhalides, and alkali metal salts of anions having low nucleophilicity.

EXAMPLE 2

Latent, thermally-curable compositions of 16.5 g (0.1 epoxy equivalent) of bis[4-(2,3-epoxypropoxy)phenyl] methane (available as epoxy resin Araldite™ PY306 from Ciba Geigy), 16.2 g (0.15 amine equivalents) of CAF, and 1.01 g (3.0% by weight based on total weight of the composition) of the cure accelerator compounds listed in Table I were prepared and their DSC Cure Exotherms determined essentially as in Example 1. The exotherm peak temperatures and reductions in peak temperature (of cure exotherm) obtained by use of the cure accelerators are shown in Table I. Also given in Table I are literature values of the reduction potentials of the compounds.

TABLE I

| Moderated Amine-Epoxy Compositions[a] | | | |
|---|---|---|---|
| | Reduction Potential, | Exotherm Temps. | |
| Accelerator[b] | $E_{1/2}$ volts | Peak[c] | Reduction[d] |
| None | — | 237 | 0 |
| Comparative Compound: 1-ethyl-3-methyl-1H-imidazolium BPh$_4$ | −1.8 (e) | 234 | 3 |
| 1,4-dimethylpyridinium BPh$_4$ | −1.5 (f) | 218 | 19 |
| N-methylpyridinium BPh$_4$ | −1.27 (g) | 217 | 20 |
| 2-chloro-1-methylpyridinium BPh$_4$ | −1.2 (gg) | 152 | 85 |
| Comparative Compound: triphenylsulphonium BPh$_4$ | −1.24 (h) | 223 | 14 |
| 3-ethyl-2-methylthiazolinium BPh$_4$ | (−1) est (i) | 138 | 99 |
| N-methylpyrimidinium BPh$_4$ | −0.98 (g) | 130 | 107 |
| 1-ethyl-(4-methoxycarbonyl)pyridinium BPh$_4$ | −0.93 (j) | 208 | 29 |
| 1-ethylquinolinium BPh$_4$ | −0.85 (k) | 183 | 54 |
| 4-cyano-1-methylpyridinium BPh$_4$ | −0.79 (j) | 161 | 76 |
| N-methylpyridazinium BPh$_4$ | −0.77 (g) | 146 | 91 |

TABLE I-continued

| Moderated Amine-Epoxy Compositions[a] | | | |
|---|---|---|---|
| | Reduction Potential, | Exotherm Temps. | |
| Accelerator[b] | $E_{1/2}$ volts | Peak[c] | Reduction[d] |
| N-methylpyrazinium BPh$_4$ | −0.71 (g) | 134 | 103 |
| N-fluoropyridinium SO$_3$CF$_3$ | −0.66 (kk) | 98 | 139 |
| N-methylpyrazinium SO$_3$CF$_3$ | −0.71 (g) | 177 | 60 |
| N-methylpyrazinium PF$_6$ | −0.71 (g) | 186 | 51 |
| diphenyliodonium BPh$_4$ | −0.5 (l) | 123 | 114 |
| 2,4,6-triphenylpyrilium BPh$_4$ | −0.37 (m) | 103 | 134 |
| 2,4,6-triphenylpyrilium BF$_4$ | −0.37 (m) | 135 | 102 |
| 4 diazo N,N-diethylaniline BPh$_4$ | −0.27 (n) | 109 | 128 |
| N-methylphenazinium BPh$_4$ | −0.16 (n) | 101 | 136 |
| cycloheptatrieneilium (C$_7$H$_7^+$) BPh$_4$ | −0.17 (o) | 70 | 167 |
| cycloheptatrieneilium (C$_7$H$_7^+$) BF$_4$ | −0.17 (o) | 88 | 149 |

[a]Composition of 16.5 g (0.1 eq.) epoxy resin PY306 and 16.2 g (0.15 eq.) CAF.
[b]1.01 g (3.0% of total weight of composition). BPh$_4$ is tetraphenylborate.
[c]Temperature of Exotherm Peak determined on a dupont Dual Cell DSC.
[d]ΔT is the lowering in exotherm peak provided by incorporation of 3.0% accelerator into the epoxy amine composition (ΔT = T$_o$−T$_E$) wherein T$_o$ is the exotherm temperature of the composition without accelerator and T$_E$ is the exotherm temperature of the composition with accelerator.
(e)–(o) are reduction potential for the various cations obtained from the literature, determined in a variety of solvents with a variety of reference electrodes. Many were converted to reference v. the saturated calomel electrode (SCE), so correlation is rough, but apparent:
(e) P. R. Gifford et al., J. Electrochem. Soc. 1987, 134, 610. 0.6 V more negative than N-butylpyridinium (acetonitrile) reported in volts vs. Ag quasireversible electrode. Given that N-alkylpyridiniums have very close reduction potentials, this compound was referenced as 0.6 volts more negative than E$_{1/2}$ for N-methylpyridinium in ref g.
(f) A. Harriman et al., J. Phys. Chem. 1988, 92, 1286. (in water) 0.13 V more negative than N-methylpyridinium which is −1.37 in water.
(g) K. B. Wiberg et al., J. Am. Chem. Soc. 1970, 92, 7154. (in dimethylformamide) potentials reported vs. Hg pool which is 516 mV cathodic of S.C.E.
(gg) Menon, R. K. et al., Inorg. Chem. 1989, 28, 1370–1379. (toluene/acetonitrile, 50/50), peak at 0.41 V more negative than 4-cyano-N-methylpyridinium, so referenced against same compound value from ref. j.
(h) K. P. Butin et al., Bull. Acad. Sci. USSR, Div. Chem. Sci. (English Translation) 1979, 6, 1329.
(i) V. Sh. Tsveniashvili et al., J. General Chem. USSR 1986, 56, 863. (dimethylformamide) closest compound is 2,5-diphenyl-3-methylthiazolium with E$_{1/2}$ = −1.08.
(j) W. M. Schwartz et al., J. Am. Chem. Soc. 1961, 83, 3164. (in acetonitrile) for N-ethyl derivatives.
(k) D. J. Casimir et al., J. Chem. Soc. (London) A. 1961, 5297. (in ethanol/water)
(kk) Lee, K. Y. et al., J. Chem. Soc. Perkin Trans. 1992, 2, 1011–1017. (acetonitrile).
(l) F. M. Beringer et al., J. Org. Chem. 1972, 37, 2484. (in water).
(m) F. Pragst et al., Electrochim. Acta 1980, 24, 341 (in acetonitrile).
(n) F. Dickens et al., Biochem. J. 1938, 32, 1615. (in water).
(o) H. Volz et al., Tetrahedron Letters 1969, 27, 2275. (−0.17 V in acetonitrile). P. H. Plesch et al., J. Chem. Soc. (London) 1971, 2052. (+0.06 V in dichloromethane).

The data of Table I shows that the Comparative Compounds, 1-ethyl-3-methyl-1H-imidazolium tetraphenylborate and triphenylsulphonium tetraphenylborate, provide almost no erduction in cure exotherm peak temperature, whereas the compounds of the invention, e.g., N-methylphenazinium tetraphenylborate, provide significant reduction.

EXAMPLE 3 -Preparation of a Molded Article a) H-methylpyrazinium tetraphenylborate (30 pbw) was milled in a paint mill with 70 pbw of epoxy resin PY306. Into a 3-neck round bottom flask equipped with a mechanical stirrer was placed 2.7 g of the resulting mixture (providing a 2.0% concentration of accelerator), 18.1 g PY306 epoxy resin, and 19.6 g of amine curative CAF. The resulting formulation was mixed at room temperature up to about 50° C. After the solid curative was well mixed in and wetted by the epoxy resin, a vacuum was applied to degas the formulation.

b) A comparative formulation (one without accelerator compound) was prepared by mixing in a similar manner 20 g PY306 epoxy resin and 19.6 g CAF amine curative.

Each formulation was poured into a 10.15 cm×20.3 cm×0.63 cm mold for compact tension tests and into a 10.15 cm×10.15 cm×0.32 cm mold for Rheometrics Dynamic Analyzer (RDA) modulus testing. Formulation (a) (of the invention) was cured at 130° C. for 4 hours, and formulation (b) (comparative) was cured at the typical temperature used in the art (177° C.) for 2 hours to give Brick A and Brick B, respectively. Each molded brick obtained was essentially void-free and suitable for mechanical testing. The test results obtained for each molding are given in Table II below.

TABLE II

| Test | Molding | |
|---|---|---|
| | Brick B | Brick A |
| DSC $T_g$ (°C.) | 161 | 145 |
| RDA $T_g$ (°C.) | 164 | 151 |
| RDA Modulus (dyne/cm$^2$) | 14.6 × 10$^9$ | 15.8 × 10$^9$ |
| Compact Tension | | |
| Average (MPam$^{1/2}$) | 0.945 | 1.207 |
| Std. Dev. | 0.068 | 0.041 |
| Coefficient of Variation | 7.2% | 3.4% |

Table II shows that Brick A, prepared from a composition of the invention, has a higher RDA modulus than does Brick B, prepared without the cure accelerator, and therefore would have a desirably greater stiffness. Brick A, having a compact tension of 1.207 MPam$^{1/2}$ versus 0.945 MPam$^{1/2}$ for Brick B, therefore has a significant improvement in fracture resistance.

EXAMPLE 4

Compositions C, D, and E were prepared essentially as described in Example 3 to contain epoxy resin Araldite™ PY306, 1.5 equivalents of CAF, and 0%, 1.0%, and 3.0% by weight of N-methylpyrazinium tetraphenylborate, respectively. Each composition was placed in brick molds essentially as described in Example 3 and heated in an oven at 121° C. After various times in the oven from 45 minutes to 6 hours, bricks of each composition were removed from the oven and their DSC $T_g$ measured. The resulting data is shown in Table III below.

TABLE III

| $T_g$ Bricks Cured for Various Times | | | |
|---|---|---|---|
| Time of cure (min.) at 121° C. | Composition | | |
| | C | D | E |
| 45 | 7 | 75 | 140 |
| 60 | 7 | 93 | 144 |
| 120 | 11 | 121 | 144 |
| 180 | 40 | 134 | 146 |
| 240 | 75 | 133 | 150 |
| 360 | — | 145 | 148 |

The data shows that Composition E (with 3% accelerator) was essentially completely cured within about one hour, and that Composition C (with no accelerator) showed only a minor amount of cure after 4 hours.

EXAMPLE 5

The same epoxy resin and amine curative were used as in Example 2. Various different cure accelerators (listed in Table IV below) (0.123 g) were individually mixed into the epoxy resin PY306 (2.00 g) by mortar and pestle, and then CAF (1.96 g) was added and dispersed in the epoxy-accelerator mixture to give 1.5 amine equivalents per epoxy equivalent and an accelerator concentration of 3% by weight. DSC cure exotherm temperatures were determined essentially as described in Examples 1 and 2. The results are shown in Table IV. For each accelerator, a 3% by weight formulation in epoxy resin PY306 was tested for epoxy homopolymerization by checking the DSC cure profile as in Example 1. For each accelerator listed in Table IV, 0.063 g of accelerator was mixed in 2.00 g of epoxy resin PY306, and DSC cure profiles showed very small (typically less than 8 cal/g) to no exothermic events, indicating that epoxy homopolymerization is not a competing reaction.

This Example shows the utility as accelerators of a variety of neutral organic compounds, coordination compounds, and organometallic compounds, all of which are π-electron acceptors.

TABLE IV

| Moderated Amine-Epoxy Compositions | | | |
|---|---|---|---|
| | Reduction Potential, | Exotherm Temps. | |
| Accelerator | $E_{1/2}$ volts$^a$ ref | Peak | Reduction |
| None | — | 237 | — |
| tetrafluorophthalonitrile | −1.21 (b) | 201 | 36 |
| tetrafluoroterephthalonitrile | −1.1 (c) | 206 | 31 |
| tetrachloro-1,4-benzoquinone | +0.01 (d) | 198 | 39 |
| tetrafluoro-1,4-benzoquinone | −0.04 (d) | 146 | 91 |
| tetracyanoquinodimethane | −0.05 (e) | 176 | 61 |
| 2,3-dichloro-5,6-dicyano-1,4-benzoquinone | +0.51 (d) | 139 | 98 |
| tris(orthophenantroline)iron(II)bis-(tetraphenylborate) | −1.34 (f) | 202 | 35 |
| copper(II)trifluoroacetylacetonate | −0.2 (g) | 191 | 46 |
| ferrocinium tetrachloroferrate | 0.35 (h) | 111 | 126 |
| tropyliummolybdenumtricarbonyl BF$_4$ | −0.5 (i) | 118 | 119 |

$^a$Reduction potentials are from the literature determined in a variety of solvents with a variety of reference electrodes. Many were converted to reference v. the saturated calomel electrode (SCE), so correlation is rough, but apparent.
b M. A. Petit et al., New J. Chemistry 1991, 15, 71. (acetonitrile).
(c) N. V. Efremova et al., J. Org. Chem. USSR 1988, 24, 47. (dimethylformamide).
(d) M. E. Peover, J. Chem. Soc. 1962, 4540. (acetonitrile).
(e) P. H. Rieger et al., J. Am. Chem. Soc. 1963, 85, 683. (acetonitrile).
(f) S. Musumeci et al., Inorg. Chim. Acta 1973, 7, 660. (acetonitrile).
(g) C. Tsiamis et al., J. Electroanal. Chem. 1988, 252, 109. (acetonitrile).
(h) I. V. Nelson et al., Analytical Chem. 1963, 35, 867. (acetonitrile).
(i) A. M. Romanin et al., J. Electroanal. Chem. 1981, 130, 245. (acetonitrile).

EXAMPLE 6: Preparation of Novel Cure Accelerators.

Cure accelerators were prepared as shown in Table V by a standard aqueous methathesis reaction of a quaternary onium halide salt dissolved in deionized water with an equivalent weight of sodium tetraphenyl borate dissolved in deionized water. The resulting mixture was allowed to stand at room temperature until precipitation was complete. The resulting precipitate was then collected by filtration and dried. The quantities of the materials used and the percent of theoretical yield of each accelerator are given in Table V.

TABLE V

| Cure Accelerator | Quaternary salt grams (moles) | $H_2O$ grams | $NaBPH_4$[b] grams (moles) | $H_2O$ grams | Yield grams | % |
|---|---|---|---|---|---|---|
| 2-chloro-1-methyl-pyridinium $BPH_4$[b] | 2-chloro-1-methyl-pyridinium iodide[a] 2.56 (0.010) | 30 | 3.43 (0.010) | 40 | 4.40 | 98.1 |
| 3-ethyl-2-methyl-thiazolinium $BPH_4$ | 3-ethyl-2-methyl-thiazolinium iodide[a] 7.72 (0.030) | 200 | 10.27 (0.030) | 100 | 13.15 | 97.5 |
| 1-ethyl-(4-methoxy-carbonylpyridinium) $BPH_4$ | 1-ethyl-(4-methoxy-carbonylpyridinium iodide[a] 5.86 (0.020) | 213 | 6.85 (0.020) | 150 | 9.48 | 97.6 |
| 2,4,6-triphenyl-pyrilium $BPH_4$ | 2,4,6-triphenyl-pyrilium chloride[c] 3.45 (0.010) | 780 | 3.42 (0.01) | 120 | 6.34 | 100 |
| N-methyl pyrimidinium $BPH_4$ | N-methyl-pyrimidinium iodide[d] 6.66 (0.03) | 100 | 10.28 (0.03) | 200 | 11.72 | 94.3 |
| N-methyl pyridazinium $BPH_4$ | N-methyl pyridazinium iodide[d] 6.67 (0.03) | 100 | 10.28 (0.03) | 200 | 12.01 | 96.6 |
| N-methyl pyrazinium $BPH_4$ | N-methyl pyrazinium iodide[d] 111.0 (0.50) | 500 | 171.1 (0.50) | 2000 | 196.7 | 94.9 |
| 4-cyano-1-methyl-pyridinium $BPH_4$ | N-cyano-1-methyl pyridinium iodide[d] 7.38 (0.03) | 100 | 10.27 (0.03) | 100 | 12.5 | 95.4 |
| 3,4-dimethyl-5-(2-hydroxyethyl thiazolium tetraphenylborate | 3,4-dimethyl-5-(2-hydroxyethyl thiazolium iodide[a] 2.83 (0.010) | 40 | 3.44 (0.010) | 40 | 4.65 | 97.3 |
| 3-benzyl-5-(2-hydroxyethyl)-4-methylthiazolinium tetraphenylborate | 3-benzyl-5-(2-hydroxyethyl)-4-methylthiazolinium chloride[a] 2.69 (0.010) | 40 | 3.42 (0.010) | 40 | 5.50 | 99.4 |
| 3-(carboxylmethyl) benzothiazolium tetraphenylborate | 3-(carboxylmethyl) benzothiazolium bromide[a] 2.75 (0.010) | 60 | 3.43 (0.010) | 40 | 4.32 | 84 |
| 2-(4-dimethylaminophenyl)-3,6-dimethylbenzothiazoluim tetraphenylborate | 2-(4-dimethylaminophenyl)-3,6-di-methylbenzothiazoluim chloride[a] 1.00 (0.004) | 15 | 1.39 (0.004) | 20 | 0.976 | 60 |
| N-fluoropyridinium tetraphenylborate | N-fluoropyridinium $SO_3CF_3$[a] 3.18 (0.010) | 200 | 3.43 (0.010) | 200 | 4.52 | 75 |
| 2,4,6-trimethyl-N-fluoropyridinium tetraphenylborate | 2,4,6-trimethyl-N-fluoropyridinium $SO_3CF_3$[a] 1.07 (0.0037) | 20 | 1.27 (0.0037) | 20 | 1.63 | 91.3 |
| 3-cyano-N-methylpyridinium tetraphenylborate | 3-cyano-N-methylpyridinium iodide[d] 2.47 (0.010) | 75 | 3.42 (0.010) | 31 | 4.11 | 93.6 |
| 2-cyano-N-methylpyridinium tetraphenylborate | 2-cyano-N-methylpyridinium iodide[d] 2.44 (0.010) | 22.5 | 3.42 (0.010) | 31 | 4.06 | 92.7 |
| N-methylated-2-methylpyrazine (may be mixture of isomers) tetraphenylborate | N-methylated-2-methylpyrazine iodide[d] 2.39 (0.10) | 75 | 3.42 (0.10) | 31 | 3.91 | 91.2 |
| N-methylpyrazinium trifluoromethanesulfonate[e] | N-methylpyrazinium iodide[d] 11.10 (0.050) | 40 ml aceto-nitrile; 10 ml methanol | 12.85 (0.050) $AgSO_3CF_3$ | 38 aceto-nitrile | 10.56 | 86.5 |
| 3-ethyl-2-methylthiazolinium trifluoromethanesulfonate[e] | 3-ethyl-2-methylthiazolinium iodide[a] 5.15 (0.020) | 15 ml aceto-nitrile | 5.14 (0.020) $AgSO_3CF_3$ | 15 ml aceto-nitrile | 5.18 | 92.8 |

[a]available from Aldrich Chemical Co.
[b]$BPH_4$ is tetraphenyl borate
[c]available from Eastman Laboratory Chemicals, Rochester, NY
[d]prepared form the corresponding heterocycle and iodomethane according to the Menschutkin Reaction (Merck Index, 10th Ed. page ONR-59) as described in Example 1
[e]prepared by standard metathesis reaction, precipitation of AgI, filtration, and drying Various modifications and alterations of this invention will become apparent to those skilled in the art without departing from the scope and spirit of this invention.

We claim:

1. A thermally-curable aromatic amine-epoxy composition comprising (a) at least one polyepoxy compound;

(b) at least about one equivalent per epoxy equivalent of at least one aromatic polyamine compound which has two or more primary or secondary amino groups attached directly to carbon atoms of an aromatic ring structure; and (c) a catalytically effective amount of at least one cure accelerator compound which is a π-electron acceptor selected from the group consisting of aromatic cations, ionic coordination compounds, ionic organometallic compounds, neutral coordination compounds, and quaternized iminothioethers, and which lowers the cure exotherm peak temperature (as measured by differential scanning calorimetry (DSC) at 10° C. per minute) of said composition by at least about 8 percent relative to a corresponding composition without said cure accelerator compound.

2. The composition of claim 1 wherein said cure accelerator compound lowers said cure exotherm peak temperature by at least about 12 percent.

3. The composition of claim 2 wherein said cure accelerator compound lowers said cure exotherm peak temperature by at least about 16 percent.

4. The composition of claim 1 wherein said cure accelerator compound has a reduction potential greater than about −1.5 volts versus a saturated calomel electrode.

5. The composition of claim 4 wherein said reduction potential is in the range of from about −1.2 volts to about +0.2 volts versus a saturated calomel electrode.

6. The composition of claim 5 wherein said range is from about −1.2 volts to about −0.16 volts versus a saturated calomel electrode.

7. The composition of claim 1 wherein said cure accelerator compound is selected from the group consisting of ionic coordination compounds, ionic organometallic compounds, quaternized iminothioethers, and aromatic cations which have a formal charge on an endocyclic atom and which are quaternized by groups other than hydrogen.

8. The composition of claim 7 wherein said cure accelerator compound is selected from the group consisting of quaternized iminothioethers, and aromatic cations which have a formal charge on an endocyclic atom and which are quaternized by groups other than hydrogen.

9. The composition of claim 1 wherein said cure accelerator compound is selected from the group consisting of 1,4-dimethylpyridinium $BPh_4$, N-methylpyridinium $BPh_4$, 2-chloro-1-methylpyridinium $BPh_4$, 3-ethyl-2-methylthiazolinium $BPh_4$, N-methylpyrimidinium $BPh_4$, 1-ethyl-(4-methoxycarbonyl)pyridinium $BPh_4$, 1-ethylquinolinium $BPh_4$, 4-cyano-1-methylpyridinium $BPh_4$, N-methylpyridazinium $BPh_4$, N-methylpyrazinium $BPh_4$, N-fluoropyridinium $SO_3CF_3$, N-methylpyrazinium $SO_3CF_3$, N-methylpyrazinium $PF_6$, diphenyliodonium $BPh_4$, 2,4,6-triphenylpyrilium $BPh_4$, 2,4,6-triphenylpyrilium $BF_4$, 4 diazo-N,N-diethylaniline $BPh_4$, N-methylphenazinium $BPh_4$, cycloheptatrieneilium $(C_7H_7^+)$ $BPh_4$, cycloheptatrieneilium $(C_7H_7^+)$ $BF_4$, tris(orthophenanthroline)iron(II)-bis (tetraphenylborate), copper(II)trifluoroacetylacetonate, ferrocinium tetrachloroferrate, tropyliummolybdenumtricarbonyl $BF_4$, and mixtures thereof.

10. The composition of claim 1 wherein said polyepoxy compound is an aromatic polyepoxide.

11. The composition of claim 10 wherein said aromatic polyepoxide is selected from the group consisting of the polyglycidyl ethers of polyhydric phenols and the glycidyl esters of aromatic carboxylic acids.

12. A thermally-curable aromatic amine-epoxy composition comprising (a) at least one polyepoxy compound;

(b) at least about one equivalent per epoxy equivalent of at least one aromatic polyamine compound having at least two primary or secondary amino groups, said compound being selected from the group consisting of 4,4'-diaminodiphenylsulphone, 3,3'-diaminodiphenylsulphone, 1,3-propanediol bis (4-aminobenzoate), and the 9,9-bis (aminophenyl) fluorenes; and (c) a catalytically effective amount of at least one cure accelerator compound which is a π-electron acceptor selected from the group consisting of aromatic cations, ionic coordination compounds, ionic organometallic compounds, neutral coordination compounds, and quaternized iminothioethers, and which lowers the cure exotherm peak temperature (as measured by differential scanning calorimetry (DSC) at 10° C. per minute) of said composition by at least about 8 percent relative to a corresponding composition without said cure accelerator compound.

13. The composition of claim 1 wherein said poly-epoxy compound comprises from about 90% to about 40% by weight of said composition, said aroma-tic polyamine compound comprises from about 10% to about 60% by weight of said composition, and the remainder of said composition comprises said cure accelerator compound.

14. The composition of claim 13 wherein said cure accelerator compound comprises from about 0.01% to about 10% by weight of said composition.

15. The composition of claim 14 wherein said cure accelerator compound comprises from about 0.05% to about 5% by weight of said composition.

16. A thermally-curable aromatic amine-epoxy composition comprising (a) at least one polyepoxy compound selected from the group consisting of the polyglycidyl ethers of polyhydric phenols and the glycidyl esters of aromatic carboxylic acids;

(b) a curing amount of at least one aromatic polyamine compound selected from the group consisting of 4,4'-diaminodiphenylsulphone, 3,3'-diaminodiphenylsulphone, 1,3-propanediol bis(4-aminobenzoate), and the 9,9-bis(aminophenyl)fluorenes; and (c) a catalytically effective amount of at least one cure accelerator compound which is a π-electron acceptor and which lowers the cure exotherm peak temperature (as measured by differential scanning calorimetry (DSC) at 10° C. per minute) of said composition by at least about 8 percent relative to a corresponding composition without said cure accelerator compound, said compound being selected from the group consisting of quaternized iminothioethers and aromatic cations which have a formal charge on an endocyclic atom and which are quaternized by groups other than hydrogen.

17. An article comprising the composition of claim 1.

18. The article of claim 17 comprising a substrate bearing a layer of said composition.

19. A process for controlling the cure-cycle viscosity of thermally-curable aromatic amine-epoxy compositions comprising the steps of (a) forming a mixture of (i) at least one polyepoxy compound; (ii) at least about one equivalent per epoxy equivalent of at least one aromatic polyamine compound which has two or more primary or secondary amino groups attached directly to carbon atoms of an aromatic ring structure; and (iii) a catalytically effective amount of at least one cure accelerator compound which is a π-electron acceptor selected from the group consisting of aromatic cations, ionic coordination compounds, ionic organometallic compounds, neutral coordination compounds, and quaternized iminothioethers, and which lowers the cure exotherm peak temperature (as measured by differential scanning calorimetry (DSC) at 10° C. per minute) of said mixture by at least about 8 percent relative to a corresponding composition without said cure accelerator compound; and (b) heating said mixture to a temperature sufficient to initiate the curing of said mixture.

* * * * *

UNITED STATES PATENT AND TRADEMARK OFFICE
CERTIFICATE OF CORRECTION

PATENT NO.: 5,541,000

DATED: July 30, 1996

INVENTOR(S): Leslie C. Hardy and Wendy L. Thompson

It is certified that error appears in the above-identified patent and that said Letters Patent is hereby corrected as shown below:

Column 12, line 56, delete "erduction" and substitute –reduction--.

Column 12, line 63, delete "H-methylpyrazinium" and substitute –N-methylpyrazinium--.

Column 13, line 56, delete "$T_g$ Bricks Cured for Various Times" and substitute –$T_g$ of Bricks Cured for Various Times--.

Signed and Sealed this

Sixteenth Day of March, 1999

*Attest:*

Q. TODD DICKINSON

*Attesting Officer*     Acting Commissioner of Patents and Trademarks